US005245912A

United States Patent [19]

Müller et al.

[11] Patent Number: 5,245,912

[45] Date of Patent: Sep. 21, 1993

[54] PROFILED TUBE FOR A WORKING CYLINDER WITHOUT A PISTON ROD

[75] Inventors: Peter Müller, Hanover; Helmut Göttling, Isernhagen; Rudolf Möller; Gerhard Scharnowski, both of Gehrden; Ralf Kook, Hanover, all of Fed. Rep. of Germany

[73] Assignee: Mannesmann Aktiengesellschaft, Dusseldorf, Fed. Rep. of Germany

[21] Appl. No.: 810,833

[22] Filed: Dec. 20, 1991

[30] Foreign Application Priority Data

Dec. 20, 1990 [DE] Fed. Rep. of Germany ....... 4041370

[51] Int. Cl.5 .............................. F01B 9/00; F16J 1/00

[52] U.S. Cl. .......................................... 92/137; 92/163; 92/177

[58] Field of Search .................... 92/88, 177, 137, 163, 92/161

[56] References Cited

U.S. PATENT DOCUMENTS

| | | | |
|---|---|---|---|
| 3,511,136 | 5/1970 | Thomas et al. | 92/163 X |
| 4,664,020 | 5/1987 | Kaiser | 92/88 |
| 4,682,535 | 7/1987 | Stoll | 92/161 X |
| 4,685,383 | 8/1987 | Ruchser | 92/88 |
| 4,829,881 | 5/1989 | Taki et al. | 92/88 |
| 4,852,465 | 8/1989 | Rosengren | 92/88 |
| 5,016,519 | 5/1991 | Goedecke et al. | 92/163 X |
| 5,035,171 | 7/1991 | Gottling et al. | 92/177 X |

FOREIGN PATENT DOCUMENTS 2404244 8/1975 Fed. Rep. of Germany ........ 92/137

*Primary Examiner*—Edward K. Look
*Assistant Examiner*—John Ryznic
*Attorney, Agent, or Firm*—Cohen, Pontani, Lieberman, Pavane

[57] ABSTRACT

The invention relates to a profiled tube for working cylinders without a piston rod having a cylinder chamber which extends in longitudinal direction and a piston guided movably therein and connected to pull means, and a carriage connected to the pull means and guided in a slide guide arranged on the profiled tube. In order to increase the torsional rigidity of a profiled tube for working cylinders having rodless pistons of this type, to guide the piston in a manner secured against turning and, at the same time, obtain a compact structural shape, the present invention provides a profiled tube have a closed single-piece cross section, that the cylinder chamber have an ovoid, preferably elliptical cross section arranged within the cross section of the profiled tube, that pressure-fluid guide channels extending in longitudinal direction are arranged within the cross section of the profiled tube, and that the slide guide is arranged along one of the outer longitudinal sides of the profiled tube and unitarily formed as a single piece with the tube.

4 Claims, 2 Drawing Sheets

PROFILED TUBE FOR A WORKING CYLINDER WITHOUT A PISTON ROD

FIELD OF THE INVENTION

The present invention relates to a profiled tube for working cylinders without a piston rod.

BACKGROUND OF THE INVENTION

In known working cylinders without a piston rod there exists a fundamental problem, that being that the movement of the piston must be transferred to the outside of the cylinder and must be capable of being taken up there to do useful work. This is done, as shown in EP 0 147 803, in the manner that the cylinder tube is provided with a slot which extends in longitudinal direction and through which driver elements are then connected with the piston, pass through the slot and, in this way, make the movement of the piston capable of being taken up to perform work outside the cylinder. It these known prior art cylinders, however, the slot must be sealed off in a relatively complicated manner so that the inside of the cylinder is fluid-tight under pressure. Working cylinders of this kind are used, in particular, in situations in which, due to the existing operating requirements, a piston rod connected to the piston and extending outward cannot be arranged. The known art technique, however, has the disadvantage that the slot greatly reduces the torsional rigidity of the cylinder tube. Another disadvantage is that, as a result of their arrangement, a widening of the cylinder and thus of the slot is unavoidable under the action of pressure. This may result in leaks which greatly reduce the force which can be taken up by the piston.

From Federal Republic of Germany Unexamined Patent Application OS 34 03 830, a working cylinder without piston rod is known, the profiled tube of which has a closed cross section. In this known working cylinder, a slot for the arrangement of a driver between the piston and an externally guided carriage is dispensed with since, in this case, a pull belt is used which is guided outward at the ends of the cylinder tube, parallel to the inside of the cylinder, via guide rollers. This known working cylinder has the disadvantage, however, that the inside of the cylinder is of round cross section, and therefore there is nothing supportive of the piston to secure it against twisting. As a result, moments of rotation, possible during the operation of the working cylinder, are transmitted to the pull belt so that the seals of the pull belt at the ends of the cylinder tube are subjected to strong load and thus are strongly worn. Such moments of rotation of the piston occur, in particular, when the ends of the pull belt are not arranged precisely on the piston, that is precisely aligned on an axis, thus moments of rotation may be imparted. Alternatively such rotation can also occur upon the operation of the piston at high speeds of displacement in the working cylinder.

It would therefore be greatly advantageous to provide a working cylinder without a piston rod which can operate without torsional displacement of the piston within the cylinder and therefor without displacement of the ends of the pull belt.

SUMMARY AND OBJECTS OF THE INVENTION

The present invention relates to a profiled tube for a working cylinder without a piston rod, or a rodless piston, wherein the cylinder is torsionally rigid and guides the piston in a manner such that it is secured against turning, while at the same time resulting in a compact structural shape.

The present invention is achieved with a profiled tube for a working cylinder without a piston rod constructed such that the profiled tube has a cylinder chamber which extends in a longitudinal direction and a rodless piston guided movably therein, connected to pull means. A carriage which is connected to the pull means and guided in a slide guide which is arranged on the profiled tube. The profiled tube has a unitary, preferably single piece cross section and the cylinder chamber has an ovoid, preferably elliptical cross section arranged within the cross section of the profiled tube. Additionally, pressure-fluid guide channels, extending in the same longitudinal direction, are arranged within the cross section of the profiled tube. The slide guide is arranged on one of the outer longitudinally extending sides of the profiled tube and integrally connected with it since the entire structure is preferably constructed of one piece. Further features of the invention are set forth below.

The use of a profiled tube having a closed, single-piece cross section in combination with a cylinder chamber of elliptical cross section arranged within the cross section of the profiled tube possesses the advantages that, on the one hand, the cylinder tube is torsionally rigid and that, on the other hand, the piston is securely guided against turning within the elliptical cross section of the cylinder chamber. In this way, the seals for the pull means are relieved of load. While the development of the inside of a cylinder with an elliptical cross section is known from French Patent Application 2 245 865, in that case it is intended for a working cylinder with piston rod. In contradistinction to this prior art, the anti-turning arrangement of the piston of the present invention serves to relieve the pull-belt seals from load and thus for smoother travel of the piston, a feature not considered or addressed in the prior art as described above.

Another advantageous feature of the present invention is to arrange pressure-fluid guide channels extending longitudinally, in an integrated fashion, within the closed cross section of the profiled tube, providing for a structural unit that is thus compact. This is also the rationale for developing the slide guide for the guided carriage as an integral part of the construction of the profiled tube.

In another advantageous development, a closed reserve channel extending in longitudinal direction is arranged within the cross section of the profiled tube so that additional structural elements can be received and guided and/or guide conduits or, for instance, compressed air fittings, etc., can be arranged simply on and/or compactly integrated in the profile tube. The provision of grooves provided with teeth extending in a longitudinal direction on at least one of the outer surfaces of the profiled tube, within which corresponding screws can be screwed, allows for the use of attachment parts without requiring the drilling of threaded holes in the body of the profiled tube. In this fashion, screws can be screwed into the profiled tube at any desired place along the toothed grooves of the working cylinder. Through the provision of guide grooves which widen in trapezoidal shape towards the inside and extend in the longitudinal direction of the profiled tube, additional attachment parts, such as position switches or the like, may also be mounted in a simple manner to the tube. As an alternative to this, the grooves can also have a trapezoidal cross section which tapers inward so as to be able also to insert attachment parts of commercial type provided with corresponding attachment elements.

It is therefore an object of the present invention to provide a profiled tube for working cylinders without a piston rod which is torsionally rigid and guides the piston in a manner secured against turning, while at the same time resulting in a compact structural shape.

It is a further object of this invention to provide a profiled tube for working cylinders without a piston rod that may be readily tooled for the provision of additional components or fittings so as to enhance its flexibility of operation and application while preserving its compact size and shape.

These and other objects and features of the present invention will become apparent from the following detailed description, considered in conjunction with the accompanying drawings. It is to be understood, however, that the drawings are designed solely for the purposes of illustration and not as a definition of the limits of the invention, for which reference should be made to the appended claims.

BRIEF DESCRIPTION OF THE DRAWING FIGURES

In the drawings, wherein like reference numerals depict like elements throughout the several views:

FIG. 1 shows a partial sectional diagram of the working cylinder of the present invention; and FIG. 2 shows an alternative cross section of the profiled tube of the working cylinder.

DETAILED DESCRIPTION OF THE PRESENTLY PREFERRED EMBODIMENTS

Figure 1:
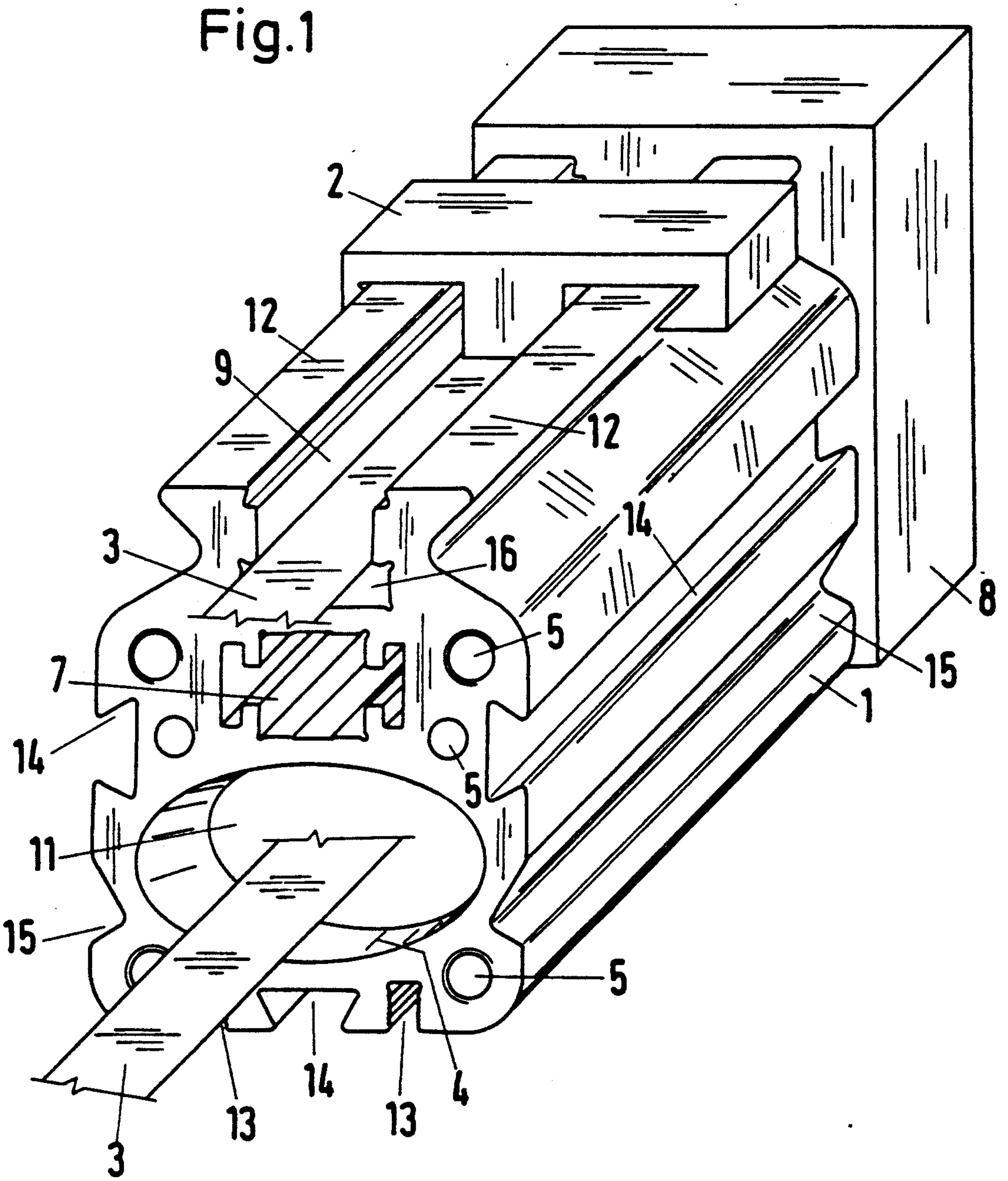

With initial reference to FIG. 1, there is shown a working cylinder without a piston rod, in which there can be noted the cross section of the profiled tube and the arrangement of the individual elements of the working cylinder. The profiled tube 1 has a closed single-piece cross section within which all elements necessary for the working cylinder can be arranged in an integrated, unitary structure, preferably of one piece construction. The cylinder chamber 4 has an ovoid, preferably elliptical cross section within which there is guidedly disposed a rodless piston 11, adapted to the cross section of the inside of the cylinder. The axial ends of the piston 11 are connected to a tensioned, belt, or pull belt 3 which extends out of the interior of the cylinder chamber 4 in the region of the cylinder head 8, where it is sealed. By means of guide rollers positioned external to the cylinder (not shown) the pull belt 3 is guided so as to run in a direction parallel to the interior of the cylinder chamber 4 in the groove 9. Pull belt 3 is fastened to a carriage 2, which carriage can move in response to the movement of the pull belt 3 imparted by the piston 11. The groove 9 is provided with a widened region 16 which, if necessary, makes it possible to receive an alternately displaced fastening element which connects the ends of the pull belt 3 to the carriage 2.

The profiled tube 1 is provided with an integral, single piece slide guide 12 which has a dovetail-shaped cross section. The carriage 2 is so formed as to be supportedly and movably guided along the dovetail slide guide 12. Within the cross section of the profiled tube 1, there are arranged pressure-fluid lines 5 which extend longitudinally within the profiled tube 1. Between the cylinder chamber 4 and the groove 9 for the guidance of the pull belt 3, there is arranged an integrated reserve channel 7 which also extends in the longitudinal direction of the profiled tube 1, parallel to groove 9 and chamber 4. Additional lines for pressure fluid, or electrical lines or the like can be guided within this channel 7. Furthermore, it is possible to insert holding elements in the channel 7 for the attachment of the aforementioned guide rollers.

Additionally or alternatively, toothed grooves 13 may be arranged on an outer surface the profiled tube 1 opposite the slide 12. These toothed grooves 13 also extend in the longitudinal direction of the profiled tube 1 and are provided with teeth which also extend in the longitudinal direction of the profiled tube 1. The teeth are so developed in the groove that the threads of screw elements can be received into the groove for mating engagement with the teeth, for instance for the screwable attachment/detachment of ancillary or optional elements. The orientation of the toothed grooves 13 in a longitudinal direction along the outer surface of the profiled tube 1 provides for the flexible mounting of screwable elements which can be inserted at any position along the toothed grooves 13. This results in the elimination of the necessity of a dimensionally correct boring of the cylinder tube at a location corresponding to the position of the fastening screws.

On other outer sides of the profiled tube 1, there are alternatively or additionally other guide grooves 14, also extending in longitudinal direction, to receive other optional attachment parts. Such attachment parts may consist, for instance, of end switches, signal indicators, etc. By means of holding grooves 15 which widen towards the outside, the working cylinder is held and/or connected to a machine.

Figure 2:
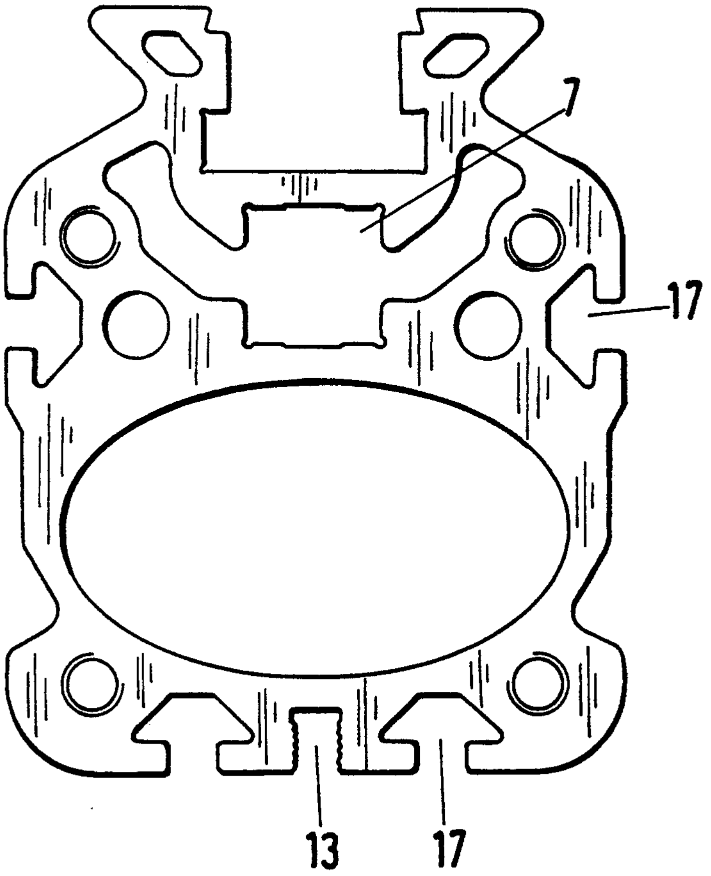

FIG. 2 shows an alternative development of the cross section of the profiled tube. The reserve channel 7 is in this case widened laterally so that material can be saved upon the production of the profiled tube without the statics, and thus the torsional rigidity of the profiled tube, suffering. The fastening grooves 17 are in this alternative embodiment of such trapezoidal shape that they taper towards the inside of the cross section of the profiled tube. In this way, it is possible to attach optional or ancillary parts of known commercial variety in simple fashion.

Taken as a whole, this profiled tube represents a compact and suitable structural shape for a pulling-belt cylinder. The improved cylinder chamber and piston shape, which results in a rodless piston which is secured against turning during operation, in combination with the compact, unitary profiled tube design which contains all essential operating elements integrated therein, provides for the release from load of the seals necessary for the pull belt and of the guide rollers and, not least of all, the pull belt itself.

It should be understood that the preferred embodiments and examples herein described are for illustrative purposes only and are not to be construed as limiting the scope of the present invention, which is properly delineated only in the claims appended hereto.

What is claimed is:

1. A working cylinder with a rodless piston, said working cylinder comprising:

a profiled tube having a unitary body and an outer surface;

a rodless piston having a cross-sectional shape and two oppositely facing ends;

a cylinder chamber for housing said piston, said cylinder chamber extending longitudinally through said body of said profiled tube and having a cross-sectional shape, said piston being driveable for guided movement within said cylinder chamber;

said cylinder chamber cross-sectional shape being ovoid;

said piston cross-sectional shape being ovoid and conforming to said cylinder chamber cross-sectional shape;

a slide guide extending longitudinally along a portion of said outer surface of said profiled tube, said slide guide formed as an integral portion of said body of said profiled tube;

a carriage, mounted for guided movement along said slide guide;

means for moving said carriage, said carriage moving means being connected to said carriage and each one of said ends of said piston, such that as said piston is guidedly driven for movement within said cylinder chamber, said carriage moves along said slide guide in response to said piston movement;

at least one channel extending longitudinally through said body of said profiled tube for carrying pressure fluid;

said body of said profiled tube additionally comprising a reserve channel extending longitudinally through said body, said reserve channel having a cross-section which defines a closed geometric shape;

said slide guide further comprising a guide groove extending longitudinally along said slide guide, said guide groove having an opening facing outwardly from said body of said profiled tube, so that a portion of said carriage moving means may be guidedly positioned within said guide groove; and at least one longitudinally extending toothed groove for the optional screwable mounting of ancillary equipment to said working cylinder, said toothed groove having groove walls integrally formed of and extending longitudinally along said outside surface of said body of said profiled tube, said teeth of said toothed groove comprising longitudinally extending ridges along said groove walls capable of making engagement with the screw threads of ancillary equipment, such that ancillary equipment may be screwably secured along said outer surface of said body of said profiled cylinder via said toothed groove.

2. The apparatus according to claim 1, wherein said unitary body of said profiled tube is of one piece construction.

3. The apparatus according to claim 1, further comprising at least one attachment groove for optionally mounting attachment components to said working cylinder, said attachment groove being integrally formed of and extending longitudinally along said outside surface of said body of said profiled tube, said attachment groove having a cross-sectional shape in the form of a trapezoid, said attachment groove being oriented such that the shortest side of said trapezoidal shape forms the opening of said attachment groove.

4. The apparatus according to claim 1, further comprising at least one attachment groove for optionally mounting attachment components to said working cylinder, said attachment groove being integrally formed of and extending longitudinally along said outside surface of said body of said profiled tube, said attachment groove having a cross-sectional shape in the form of a trapezoid, said attachment groove being oriented such that the longest side of said trapezoidal shape forms the opening of said attachment groove.

* * * * *